Patented Mar. 1, 1932

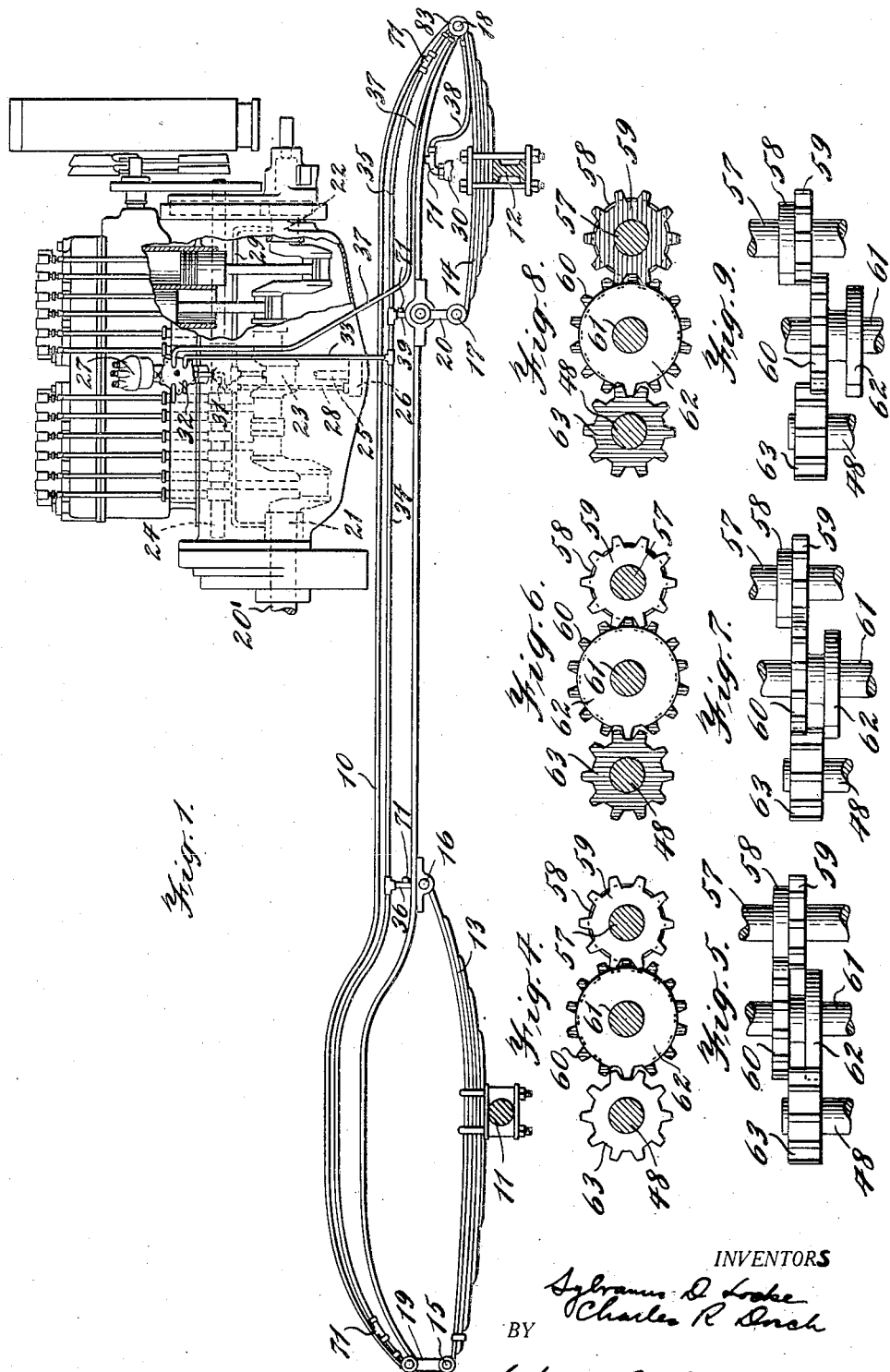

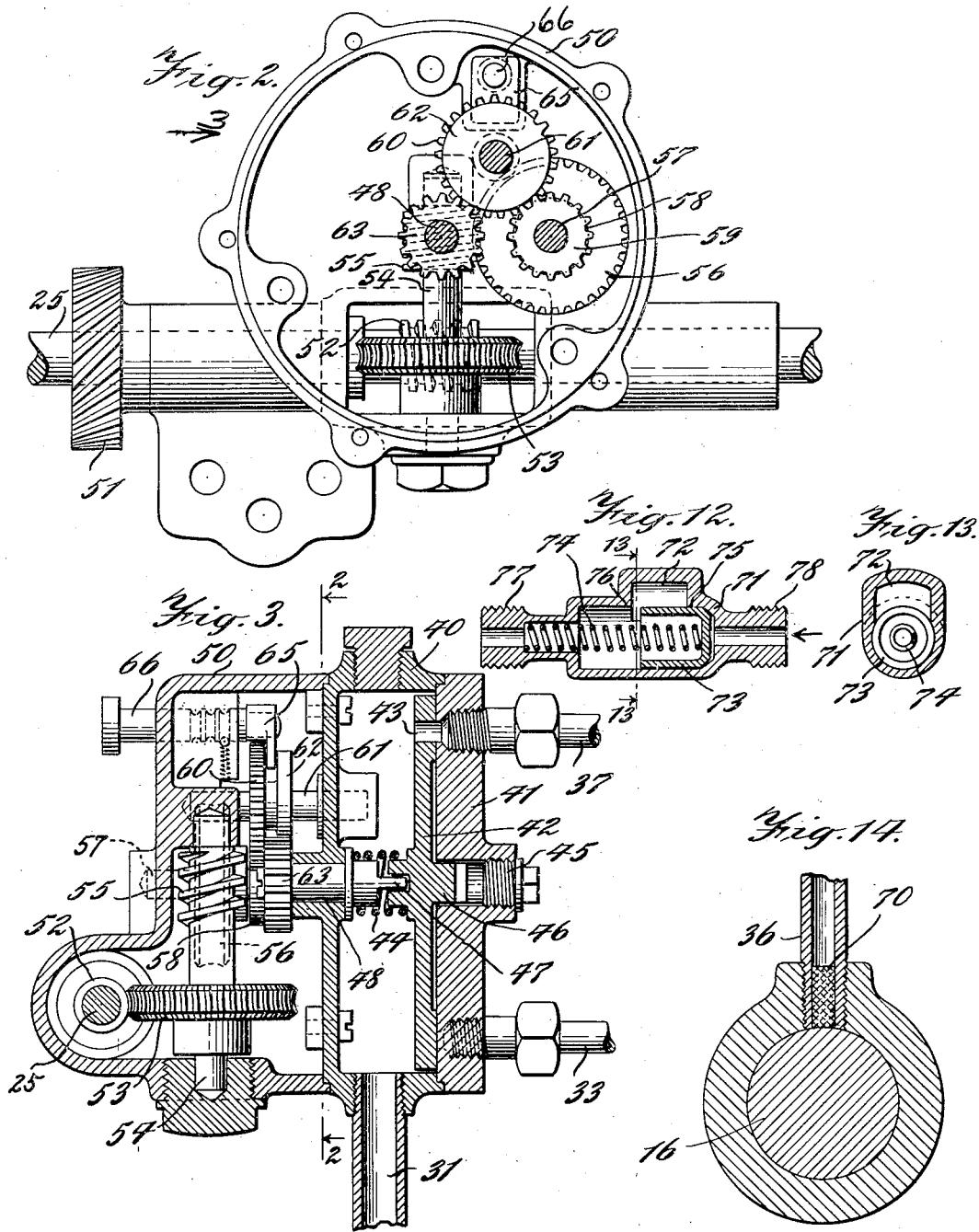

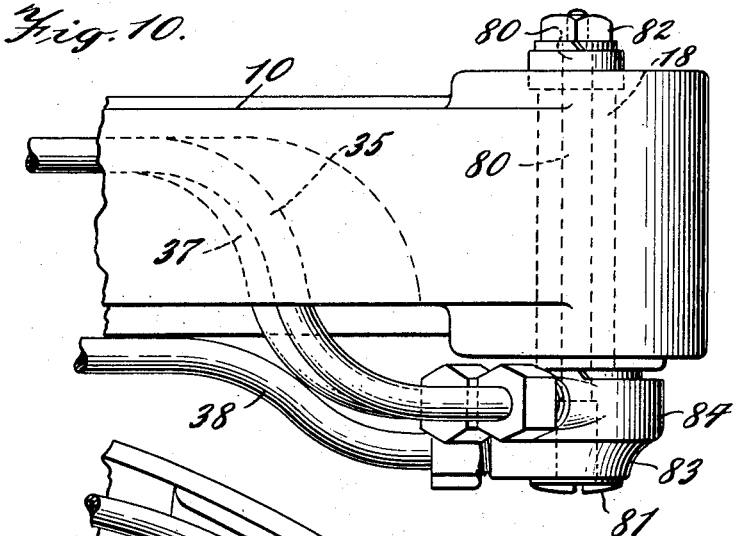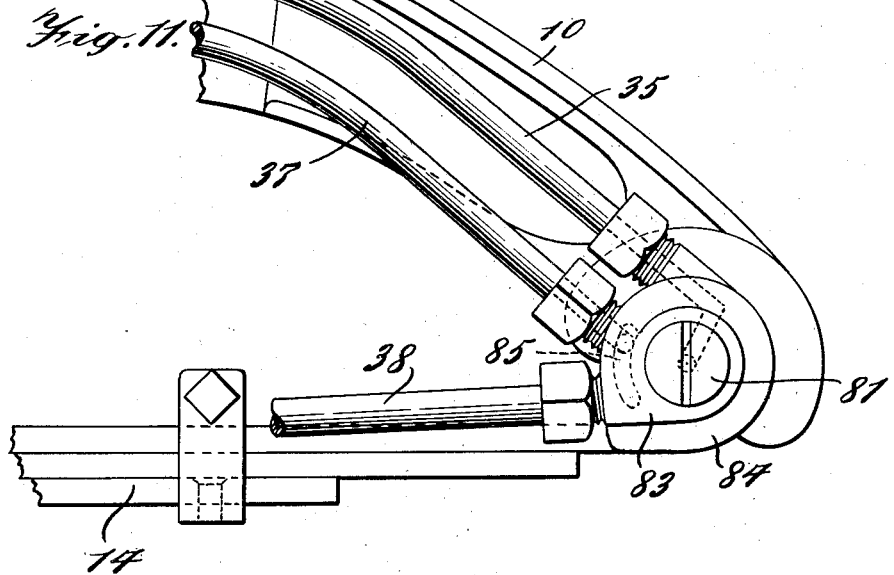

1,847,434

UNITED STATES PATENT OFFICE

SYLVANUS D. LOCKE, OF BRIDGEPORT, AND CHARLES R. DOSCH, OF STRATFORD, CONNECTICUT, ASSIGNORS, BY MESNE ASSIGNMENTS, TO ALEMITE CORPORATION, OF CHICAGO, ILLINOIS, A CORPORATION OF DELAWARE

LUBRICATING APPARATUS

Application filed September 20, 1920. Serial No. 411,533.

Our present invention relates to a lubricating apparatus for mechanism, and more particularly for motor vehicles.

One of the objects of our invention is to provide an arrangement by which all parts of a vehicle requiring lubrication may be automatically lubricated in accordance with the need of each bearing. Another object of our invention is to provide a mechanism by which some of the bearings of a motor vehicle may be lubricated with a continuous stream of lubricant, while others are lubricated only intermittently, all the lubricant being supplied from a common source. Another object of our invention is to provide a means by which a bearing may be lubricated automatically and intermittently by a predetermined amount of lubricant from a continuously operating pump. Another object of our invention is to provide a means by which oil may be conveyed from one part of a motor vehicle to another where such parts are relatively movable, without danger of breakage of the oil conveying pipes. Another object of our invention is to provide a means by which a quantity of oil may be supplied to a branched pipe, the branches of which lead to different bearings, and by which each bearing will obtain its required amount of lubricant from the common supply pipe.

With these and other objects in view our invention consists of the construction and arrangement of parts hereinafter described and more fully pointed out in the appended claims.

In the drawings, Fig. 1 is a side elevation of a part of an automobile, which we have adopted to illustrate one form of our invention, showing in more or less diagrammatic form a part of the chassis and of the engine, the engine being shown above its normal position for the sake of clearness; Fig. 2 is an elevation of an illustrative form of distributer valve which may be used in carrying out our invention, Fig. 2 being a section of Fig. 3 on the line 2—2; Fig. 3 is a vertical central section of Fig. 2 looking in the direction of the arrow 3; Figs. 4 and 5 are, respectively, elevation and plan of the combination of intermittently and continuously moving gearing shown in Figs. 2 and 3, with the gearing arranged as for the normal operation of our device; Figs. 6 and 7 correspond to Figs. 4 and 5, with the intermittent gearing thrown out of operation, and continuous gearing substituted therefor; Figs. 8 and 9 correspond to Figs. 4 and 5, but with the gearing thrown entirely out of operation; Figs. 10 and 11 are enlarged plan and elevation, respectively, of a portion of Fig. 1, showing an illustrative method by which lubricant may be conveyed between the relatively movable parts of the vehicle without danger of breaking the piping; Fig. 12 is a longitudinal section showing an illustrative form of measuring device; Fig. 13 is a vertical section on the line 13—13 of Fig. 12; and Fig. 14 is an enlarged view of a detail.

In the drawings, corresponding parts have corresponding characters.

As an illustration of one form in which our invention may be applied, we have shown it in connection with an automobile of a known type, in which 10 is a side bar or member shown as having a channel section, as is usual, and 11 and 12 are, respectively, the rear and front axles or parts which ultimately carry the weight of the vehicle to the wheels. Between the parts 11 and 12 and the side member 10 are the usual springs 13, 14, connected by shackle bolts 15, 16, 17 and 18, all as usual, the shackles 15 and 17 being connected with pins attached to the frame 10 by the links 19, 20. On the frame 10 is carried a gas engine of any of the well known types, and which generally is suspended on the side frames, so that the center line of its crank shaft extends just above the axle 12. In Fig. 1, however, in order to clarify the disclosure, the engine is shown above its normal position. In the form of the engine which we have adopted for purposes of illustration, 20' is a crank shaft extending along the engine base and having rear bearing 21, front bearing 22, and middle bearing 23. Driven through suitable gearing is a cam or timing shaft 24, which, in the form illustrated, is provided at its central portion with a spiral gear (not shown)

which drives a vertical shaft 25 (broken away for sake of clearness) through a spiral gear 51 (Fig. 2) thereon. At the lower end of this vertical shaft is a rotary oil pump 26, and at its upper end is the usual ignition timing device 27.

All of the parts thus far described are old in the art and further description will be unnecessary to a correct understanding of our invention.

The shackle bolts connecting the springs 13, 14 with the side frames, as well as other bearings, such as the steering knuckles and links, valve rocker arms and the like, require a relatively small amount of lubricant at relatively long intervals, since the motion of the parts carried thereon is comparatively small. Nevertheless, some lubrication is required, and heretofore, it has been the usual practice to lubricate each of these bearings separately by applying the lubricant directly to them whenever the user of the machine deemed it necessary. This non-automatic lubrication results in frequent neglect, and is, in any event, a task avoided, if possible, by the user of the vehicle.

It has been the usual practice to flood the bearings of the crank shaft and sometimes of other parts of the engine with lubricant carried in the base of the engine, the pump 26 supplying a continuous stream through a pipe 28 to a horizontal branched pipe 29, and thence to the continuously running crank shaft bearings. The surplus oil falls back to the bottom of the crank casing from which it is pumped up again by the pump 26. As a preferred means for carrying out our invention, we use the pump 26 as a source of supply for the lubrication of the shackle bolts and for any other parts of the vehicle which require only a relatively small amount of lubrication, such as the steering knuckle, one of which is illustrated at 30, the rocker arms for overhead valve engines and the like. It is obvious, however, that since the pump 26 is supplying a continuous stream of oil to the motor bearings, an apparatus must be provided to modify this supply so as to adapt it to lubricate the parts just referred to. As an illustrative form of our invention, we provide a pipe 31 in continuation of the pipe 28 and extending through the motor casing to a valve mechanism, which we designated generally in Fig. 1 by the character 32, which valve mechanism, as will be more fully explained hereinafter, is operated, in the illustrative form of our invention, by the vertical shaft 25. From the valve mechanism 32 leads one or more pipes which connect through suitable branches with the several bearings to be lubricated. For instance, a pipe 33 extends to horizontal pipes 34 and 35 supported in the side frame 10. The pipe 34 through pipe 36 communicates with the shackle bolts 16 and directly with the pin supporting the member 19 through which the lubricant may be carried directly to the shackle bolt 15. Similarly, pipe 35 leads to the shackle bolt 18. A second pipe 37 also extends from the valve 32 to an arrangement at the front end of the frame 10, which will be more specifically described hereinafter, and thence a pipe 38 extends to the steering knuckle 30. A branch 39 connects the pipe 35 with the supporting pin over the link 20 and thence the lubricant will flow to the shackle bolt 17. Similar pipes will connect the valve 32 with any other bearings it is desired to lubricate.

Preferably, we arrange the valve 32 so that the several lubricant feed pipes will be connected to the oil supply pump 26 at definite intervals, which ordinarily will be relatively widely spaced apart in time. One form of such valve mechanism, which may be used in connection with our invention, is shown in enlarged view in Figs. 2 and 3, in which 40 is a valve casing having a cover 41 through which extend the pipes 33 and 37, and as many more as may be desired to supply different bearings to be lubricated. In the casing 40 is a valve plate 42 having one or more openings 43 arranged to pass over the entrances to the pipes 33, 37 and held against the cover 41 by a spring 44. A screw plug 45 is arranged so that by screwing it inward, it will press against the pivot 46 of the plate 42 and lift the plate from its contact with the cover 41 when it is desired to flood the several bearings to be lubricated, or to clean the pipes or the like.

The valve plate 42 is rotated by a tongue 47 engaging in a groove in the valve plate 42 and carried on the end of a shaft 48 supported in a bearing in the casing 40. The pipe 31 extends into one side of the chamber in the casing 40 to supply the lubricant thereto from the pump 26, and it will be seen that when the opening 43 registers with any one of the lubricating pipe openings, the pressure from the pump 26 will be transmitted, through the pipe 31 and the casing 40, into the pipe for so long as the opening 43 is opposite the pipe opening. Preferably, as in the form illustrated, the plate 42 is rotated by the engine, so that the oil supply to the several bearings may be governed by the approximate distance travelled. At the rear of the casing 40 is a casing 50 which carries suitable gearing to connect the engine with the valve plate 42. On the shaft 25 is a spiral gear 51 engaging with a corresponding gear on the cam shaft 24 of the engine, this shaft 25 being carried through suitable bearings in the casing 50 and extending to the ignition timing device in the form illustrated in the drawings. On the shaft 25 is a worm 52 engaging with a worm gear 53 carried by a vertical shaft 54 supported in the casing 50. A second worm 55 is mounted on the shaft 54 and meshes with a worm gear 56 on a horizontal shaft 57. While these worms and gears considerably reduce the speed of the shaft 57 in comparison with the speed of the engine shaft, yet it will be obvious to those skilled in the art that if this gearing were directly connected to the plate 42, the several bearings would be lubricated at too frequent intervals. Preferably, therefore, we introduce between the shaft 57 and the plate 42 broken or intermittent gearing, which will still further considerably increase the ratio between the turns of the engine and of the plate 42 and yet which will cause the plate 42 to turn with a relatively high velocity when the opening 43 is passing the end of one of the lubricating pipes, so as not to prolong unduly the time during which pressure is applied from the valve chamber to the pipe. As an illustrative form of such broken gearing, we have shown a single toothed gear 58 attached to shaft 57 and beside it a spur gear 59. The single toothed gear 58 engages with the tooth of the spur gear 60 on an idler shaft 61, the hub of the gear 60 having attached to it a single toothed gear 62 which engages with a wide faced gear 63 connected to the shaft 48 through which the plate 42 is driven by the tongue 47. The relative arrangement of these gears is best shown in Figs. 4 and 5 where the shafts have been shown as in the same plane, although in the form illustrated, the shaft 61 is actually at one side of the plane of the shafts 48 and 57. As a convenient means of locking gears 60 and 63 against rotation, except when the single teeth of gears 58 and 62 are engaging therewith, the body portions of gears 58 and 62 may be provided with circular portions arranged to contact with the extreme edges of the teeth on gears 60 and 63, as shown in Figs. 4, 6 and 8.

With the shaft 25 continuously rotating, the shaft 57 is also continuously rotated, but at a relatively low rate of speed by reason of the worm and worm gears between the two shafts. The shaft 48 and with it the plate 42 is given an intermittent or step by step motion at prolonged intervals and only when the single toothed gear 62 engages with the gear 63. This engagement does not occur, of course, until the single toothed gear 58 has made a sufficient number of turns to rotate the gear 60 once. By proper proportion of the parts, however, the opening 43 may be made to pass entirely across the entrance to one of the oil pipes during the time of engagement of the single tooth of the gear 62 with the gear 63, and since, at that time, the single tooth of gear 58 is also engaged with the gear 60, there is, for that interval only, a substantially continuous gear connection between the plate 42 and the engine shaft. Thus the time of opening of the valve 43 may be relatively short and yet the valve plate 42 be so moving that the total time for it to make one rotation may be exceedingly long. Our combination of continuous and intermittent reduction gearing, therefore, does not merely reduce the speed of the valve plate 42 in relation to the engine shaft, but it gives the valve plate 42 a motion which is peculiarly useful in carrying out our invention.

The gears 60, 62 are freely rotatable on the shaft 61 and may also be slid longitudinally thereof from the position shown in Fig. 5 to those shown in Figs. 7 to 9, this sliding being accomplished by a tongue member 65 on the end of a longitudinally movable stud 66 extending through the casing 50, this stud being held in any one of three adjusted positions by means of a spring-held ball detent of any well known type, the ball engaging in suitable grooves in the stud 66. In Figs. 3, 4 and 5, the gearing is shown in the position in which it will be during the normal operation of our device, but if it is required to cut out the operation of the intermittent gearing, as may be desired under some circumstances, the stud 66 is moved to its central position, thus carrying the gearing to the position shown in Fig. 7, so that the plate 42 will be continuously rotated, thus greatly shortening the intervals between the lubrications of the bearings. A further motion of the stud 66 will move the gear to the position shown in Fig. 9, which completely disconnects the plate 42 from the engine shaft in the event that it is desired to suspend the automatic lubrication of the bearings.

At each rotation of the valve plate 42 and during the time the opening 43 registers with the end of the pipe 33, the pump 26 will be directly connected to the pipes 34 and 35 through the common supply pipe 33, and oil under pressure will, therefore, be forced or attempted to be forced into the pipes 34, 35 and from them into the bearings connected therewith. Similarly, when opening 43 registers with the end of pipe 37, oil will be forced to the bearings to which it leads. In some instances, it will be sufficient to prevent the flooding of the bearing to provide a flow retardant in each branch, such a retardant being illustrated in Fig. 14 in which a plug, as a cotton wicking 70, is inserted in the pipe 36 leading to the bearing 16, and preferably so as to be in contact with the bearing itself.

For greater certainty in the supply of the lubricant to each bearing, however, we preferably provide a means adjacent each bearing by which a measured quantity of lubricant will be supplied to the bearing each time that the distributor valve is open. One form of such a means we have illustrated in the arrangement shown in Figs. 12 and 13 in which a body member 71, which may be connected in the line of piping preferably adjacent the bearing to be lubricated, has formed therein a laterally disposed chamber 72. Within the central cavity of the member 71 is a sliding valve 73 normally held in the position shown in Fig. 12 by a spring 74. The valve 73 is so arranged in relation to the chamber 72 and its connection with the central cavity of the body member 71, that the valve 73 in effect works between two valve seats, one of which may be designated as the portion 75 of the member 71 and the other as the portion 76 of the member 71. It will be seen that, in the position shown in the drawings, the valve 73 is seated against valve seat 75, so as to close the pipe against the flow of fluid in the direction of the arrow in Fig. 12 until the pressure of such fluid is great enough to overcome the pressure of the spring 74. When the valve is in this position, it is to the right of the seat 76 (Fig. 12), so as to connect the chamber 72 with the central cavity. This would permit any fluid in the chamber 72 to flow out into the central cavity and finally out of the end 77. When the valve 73 is moved to the left of Fig. 12, however, so that it seats itself against the seat 76 by sliding longitudinally in the central cavity, the valve illustrated is long enough to first cut off the chamber 72 from all connection with the central cavity and finally, by the further motion to the left of the valve 73, to open the chamber 72 to the end 78 of the valve body, thus permitting fluid to flow from the end 78 into the cavity 72.

In practice, we preferably arrange one of the measuring valves just described adjacent the bearing to be lubricated and so that the central cavity thereof constitutes a part of the pipe conveying lubricant to the bearing. In the illustrative form of our invention, all or a portion of the lubricating pipes will be filled at all times with lubricant, but the spring 74 will be so designed as to form a sufficient resistance to the weight of this column of lubricant to prevent the valve being moved from the position shown in Fig. 12, except when the valve 32 is open. Then the pressure of the pump 26 will cause the valve 73 to move to the left of Fig. 12 and the lubricant to be forced into the chamber 72. It cannot be forced beyond this chamber, however, at this time, because the valve 73 is also closed against seat 76 to prevent egress through the end 77. When the valve 32 is closed and the pump pressure on the lubricant ceases, then the spring 74 returns the valve to the position shown in Fig. 12, thus simultaneously permitting the lubricant in the chamber 72 to flow out through the end 77, and at the same time preventing any lubricant from flowing through the end 78 and the pipe connected therewith into the chamber 72. In other words, for each cycle composed of an increase and a decrease of pressure on the lubricant due to the opening and the closing of the valve 32, a quantity of fluid, determined by the size of the chamber 72, is passed to the bearing, and this quantity is entirely independent of the duration of the valve opening or of the pressure to which the lubricant is subjected by the pump 26, provided such pressure is sufficient to overcome the spring 74. Since in the normal operation of a motor vehicle this pump pressure and the duration of the opening of the valve may vary within relatively wide limits due to the varying speed at which the engine operates, it is highly desirable to provide some means which will assure a uniform lubrication of the bearing independent of the valve 32, and the arrangement just described accomplishes this end.

It will be understood by those skilled in the art that the form of the measuring valve may be widely varied. The simple form which we have chosen for illustrative purposes is relatively inexpensive to manufacture, and sufficient for our purposes.

As has been stated above, there are some bearings of a motor vehicle which move bodily in relation to the frame and the motor and if the oil pipe were run directly from the frame portion of the chassis to such a bearing, such a pipe would be subjected to constant bending and distortion, which would ultimately cause it to break. To avoid this, we have provided an arrangement which is illustrated as lubricating one of the steering knuckles 30, although it will be understood that it may be applied to any similarly disposed bearing. As shown best in the enlarged views, Figs. 10 and 11, the bearing pin 18 carried in the frame 10 is, in the illustrative form, provided with a pin 80 extending therethrough and having a head 81 at one end and a nut 82 with a lock washer at the opposite end. Between the head 81 and the body of the bearing pin 18 are provided a pair of cylindrical members 83, 84, each having a flat face, the two flat faces being held together by the pressure of the nut 82 and the spring washer beneath it. Preferably, the member 84 is fastened to the bearing pin 18 or to the frame 10, so as to be relatively immovable, and the member 83 is permitted to turn in relation to 84. In the arrangement shown, the pipe 35 conducts the lubricant through a suitable channel in the member 84, and thence through other suitable channels to the bearing surface of the bearing pin 18. Into another portion of the member 84 is connected the pipe 37 which communicates with an opening terminating in the flat face of the member 84. In the flat face of the member 83 is a channel or groove 85 arranged to communicate at all times with the end of the pipe 37, which groove, in turn, communicates through suitable openings in the member 83 with a pipe 38 leading directly to the bearing 30 through one of the measuring valves 71. The length of the groove 85 is sufficient to take care of the rotation of the member 83 in relation to the member 84, which rotation is caused by the yielding of the spring 14. The spring washer under the nut 82 will ordinarily provide sufficient pressure between the flat faces to form an oil-tight joint, but it will be understood that other means may be provided to this end, and indeed, if desired, the two relatively rotatable parts 83, 84 may be made so that one surrounds the other instead of being in alignment, as illustrated.

With the parts arranged as shown in the drawings, and the engine in motion, lubricant will be supplied continuously to some of the bearings, and particularly to the shaft bearings of the engine. The gearing connected to the valve 32 will also be moved, but by reason of its character will rotate the valve plate 42 relatively slowly, so as to open the valve 32 only after a predetermined number of turns of the engine. If the machine has been in use previously, the several pipes will be filled with lubricant, none of which can pass to the respective bearings, however, because of the position of the valve 73. When, in the course of the turning of the plate 42, one of the openings 43 registers with the end of one of the pipes, then the pump pressure is transmitted to the lubricant in the pipes, causing the measuring valve to operate to cut off the chamber 72 from the bearing, and by virtue of this motion tend to force any lubricant which remains in the central cavity of the valve body 71, which has not yet flowed to the bearing, into the bearing. As soon as the chamber 72 is in communication with the lubricant in the pipe, the chamber will be filled or nearly filled according to the amount of air therein, and the valve 73 will remain in this position until the continued motion of the plate 42 has closed the distributor valve 32. Then valve 73 returns to its initial position, and the lubricant in the chamber 72 may flow into the bearing. By providing the wicking 70 between the valve body 71 and the bearing, the motion of the valve 73 will be prevented from forcing the lubricant in the central cavity of the valve body 71 directly into the bearing, the wicking acting as a resistant and absorbent, which will permit the lubricant to pass gradually to the bearing.

While we prefer to use the lubricant in the engine base as a source of supply, it will be understood that a separate reservoir may be used for the supply to the intermittently lubricated bearings. It will also be understood that the form of the distributor valve may be varied within wide limits and may be of any of the known types other than the rotary valve which we have chosen for purposes of illustration. It will also be understood that, if desired, individual pipes may be run from the distributer valve to each bearing, but preferably we provide a branched system to economize in tubing. While preferably we arrange our system so that the pump or other feed pressure is applied to the lubricant in the piping at relatively short intervals, it will be understood that the reverse operation could be provided. That is to say, the valve could be so arranged, by forming opening 43 as a long circular slot, so that the pressure on the lubricant would continue for a greater time than the period in which it is relieved. The presence of the measuring valve would prevent the lubricant from being forced into the bearings, and with such an arrangement, the valve 73 would be held normally in the position to the left of that shown in Fig. 12. Then when the distributer valve was closed and the pressure on the lubricant in the piping relieved, spring 74 would move valve 73 to the position shown in Fig. 12 to permit the lubricant in the chamber 72 to pass to the bearing. While preferably we make the chamber 72 a part of the body member 71, it will be understood that such a chamber could also be provided by a suitable pipe acting as a by-pass around a two-ported valve arranged to close one end of the chamber when the other end of the chamber is open.

The claims of this application cover broadly the different types of systems disclosed herein, and cover specifically the systems in which measuring valves are incorporated to meter the charges of lubricant to the individual bearings, while the claims of our co-pending application, Serial No. 47,284, filed July 31, 1925, cover specifically the systems in which flow retardants are utilized to meter the charges of lubricant to the individual bearings.

While we have illustrated and described our invention as it would be applied to a motor vehicle, it will be understood that it may be applied to other kinds of machines, and furthermore that some parts of our invention may be used independently of other parts thereof.

We claim:—

1. In a motor driven vehicle, an oil reservoir, connections between a bearing of the vehicle and the reservoir, metering means in said connections, and means driven from the vehicle motor to control the flow of oil through said connections.

2. In a motor driven vehicle, an oil reservoir, connections between a bearing of the vehicle and the reservoir, metering means in said connections, a valve to control the flow of oil through said connections and mechanism driven from the vehicle motor to open and close said valve intermittently.

3. In a motor driven vehicle, an oil reservoir, connections between a bearing of the vehicle and the reservoir, metering means in said connections, a valve to control the flow of oil through said connections and mechanism driven from the vehicle motor, including a train of reduction gearing, to open and close said valve intermittently.

4. In a motor driven vehicle, an oil reservoir, connections between a bearing of the vehicle and the reservoir, a valve to control the flow of oil through said connections and mechanism driven from the vehicle motor, including a train of reduction gearing, a portion of which is intermittently operating while the motor is running, to open and close said valve intermittently.

5. In a motor driven vehicle, an oil reservoir, connections between bearings of the vehicle and the reservoir, means driven by the motor vehicle to apply pressure to the oil in said connections, and means between the pressure-applying means and the bearings to regulate simultaneously the supplies of oil to the individual bearings.

6. A lubricating system for machine bearings, comprising a lubricant reservoir, connections, including a conduit, from the reservoir to a bearing to be lubricated, mechanism for intermittently producing and relieving pressure on the lubricant in the conduit, and a valve mechanism in said conduit between the pressure producing mechanism and the bearing, comprising a pair of oppositely disposed seats with a chamber therebetween and a pair of connected valves, each adapted to cooperate with one of said seats to form inlet and outlet valves, respectively, said valves being constructed and arranged so that one is open when the other is closed and to be moved between open and closed position for each alternation of pressure in the conduit.

7. A lubricating system for machine bearings, comprising a lubricant reservoir, connections, including a conduit, from the reservoir to a bearing to be lubricated, mechanism for intermittently producing and relieving pressure on the lubricant in the conduit, and a valve mechanism in said conduit between the pressure producing mechanism and the bearing, comprising a pair of oppositely disposed seats with a chamber therebetween and a pair of connected valves, each adapted to cooperate with one of said seats to form inlet and outlet valves, respectively, the outlet valve being closed and the inlet valve open when pressure is applied to the lubricant in the conduit and the outlet valve being open and the inlet valve closed when the pressure is relieved.

8. A lubricating system for machine bearings, comprising a lubricant reservoir, connections, including a conduit, from the reservoir to a bearing to be lubricated, mechanism for intermittently producing and relieving pressure on the lubricant in the conduit, and a valve mechanism in said conduit between said mechanism and the bearing comprising a pair of valves and a chamber therebetween constructed and arranged to prevent lubricant flowing from said conduit to said chamber and to permit lubricant to flow from said chamber to the bearing when no pressure is applied to the lubricant in the conduit, and to permit lubricant to flow from the conduit into the chamber and to prevent lubricant from flowing from the chamber to the bearing, when pressure is applied to the lubricant in the conduit.

9. A lubricating system for machine bearings, comprising a lubricant reservoir, a conduit having branches, each connected to a bearing to be lubricated, machine driven mechanism for intermittently producing pressure in the conduit and simultaneously supplying a quantity of lubricant thereto, and means located in each branch accurately to apportion the quantity of lubricant delivered from each branch to its bearing in predetermined relative quantities dependent upon the requirements of the individual bearings, independently of the bearing resistances.

10. A lubricating system for machine bearings, comprising a lubricant reservoir, a conduit having branches, each connected to a bearing to be lubricated, mechanism driven by said machine for intermittently producing pressure in the conduit and simultaneously supplying a quantity of lubricant thereto, and means located in each branch to regulate the quantity of lubricant delivered from each branch to its bearing, said means comprising an inlet and an outlet valve connected together with a chamber between them, said valves being constructed and arranged so that one is closed prior to the opening of the other.

11. A lubricating system for machine bearings, comprising a lubricant reservoir, a conduit having branches, each connected to a bearing to be lubricated, mechanism for intermittently producing pressure in the conduit and simultaneously supplying a quantity of lubricant thereto, and means located in each branch to regulate the quantity of lubricant delivered from each branch to its bearing, said means comprising an inlet and an outlet valve connected together with a chamber between them, said valves being constructed and arranged so that when one is opened the other is closed, the inlet valve being normally closed and arranged to be opened by pressure applied to the lubricant.

12. A lubricating system for machine bearings, comprising a conduit leading to a bearing, means to maintain lubricant in the conduit and separate mechanism to measure and deliver intermittently a quantity of lubricant from the conduit to the bearing, said mechanism comprising an inlet and an outlet valve connected together with a chamber between them, said valves being constructed and arranged so that when one is opened the other is closed, said inlet valve being normally closed and arranged to be opened by pressure applied to the lubricant in the conduit.

13. A lubricating system for the bearings of a motor driven vehicle comprising a lubricant reservoir, a branched conduit system leading from said reservoir to the chassis bearings of said vehicle, means to measure and deliver different quantities of lubricant to the individual bearings in accordance with their respective requirements, and intermittently operating mechanism controlled by said vehicle to admit lubricant flow from said reservoir to said measuring means.

14. A lubricating system for the bearings of a motor vehicle, comprising an oil reservoir, a conduit leading from the reservoir to the bearings, metering means in the conduit adjacent each bearing, and means operated by the engine to control the supply of oil from the reservoir to the conduit and the bearing.

15. A lubricating system for the bearings of a motor vehicle comprising an oil reservoir, a conduit leading from the reservoir to the bearings, metering means in the conduit adjacent each bearing, and a valve operated intermittently by the engine to control the supply of oil from the reservoir to the conduit and the bearings.

16. A lubricating system for the bearings of a motor vehicle, comprising an oil reservoir, a conduit leading from the reservoir to the bearings, a metering device for each bearing, a valve to control the supply of oil from the reservoir to the conduit and the bearing, and mechanism, driven by the engine, to operate said valve intermittently at long intervals relatively to the revolutions of the engine.

17. A lubricating system for the bearings of a motor vehicle comprising an oil reservoir, a conduit leading from the reservoir to a bearing, a valve to control the supply of oil from the reservoir to the conduit and the bearing, and mechanism, driven by the engine, to operate said valve intermittently at long intervals relatively to the revolutions of the engine, said mechanism comprising a train of reduction gearing, a portion of which is intermittently running while the engine is running.

18. A lubricating system for the bearings of a motor vehicle comprising an oil reservoir, a conduit leading from the reservoir to a bearing, a valve to control the supply of oil from the reservoir to the conduit and the bearing, and mechanism, driven by the engine, to operate said valve intermittently at long intervals relatively to the revolutions of the engine, said mechanism comprising a train of reduction gearing, a portion of which is intermittently running while the engine is running, and means, under the control of the operator, to shift said gearing whereby the intervals between the successive operations of the valve may be considerably shortened.

19. A lubricating system for the bearings of a motor vehicle comprising an oil reservoir, a conduit leading from the reservoir to a bearing, a valve to control the supply of oil from the reservoir to the conduit and the bearing, and mechanism, driven by the engine, to operate said valve intermittently at long intervals relatively to the revolutions of the engine, said mechanism comprising a train of reduction gearing, a portion of which is intermittently running while the engine is running, and means, under the control of the operator, to disconnect said valve from the engine, to suspend the operation of the lubricating system.

20. The combination with a plurality of bearings, of a conduit for supplying lubricant to said bearings comprising a plurality of branch conduits, one of which leads to each of said bearings, means for intermittently supplying lubricant under pressure to said conduit, means in each branch conduit adjacent the corresponding bearing for preventing the flow of lubricant to said bearing when the pressure on the lubricant in said branch conduit is initiated, and means operable upon decrease of the pressure upon the lubricant in said branch conduit for delivering a quantity of the lubricant in said branch conduit to said corresponding bearing.

21. The combination with a plurality of bearings, of a conduit for supplying lubricant to said bearings comprising a plurality of branch conduits, one of which leads to each of said bearings, means for intermittently supplying lubricant under pressure to said conduit, means in each branch conduit for preventing the flow of lubricant to said bearing when the pressure on the lubricant in said branch conduit is initiated, and means operable upon decrease of the pressure upon the lubricant in said branch conduit for delivering a quantity of the lubricant in said branch conduit to said corresponding bearing.

22. The combination with a plurality of bearings to be lubricated, of a conduit leading to each of said bearings, lubricant supplying means for intermittently delivering lubricant under pressure to said conduits, means in said conduits operable by the pressure of the lubricant, for preventing the delivery of lubricant to said bearings while said lubricant supplying means is operating to increase the pressure on the lubricant in said conduits, and means operable upon the decrease of pressure in said conduits for delivering a quantity of lubricant to said bearings.

23. The combination with a plurality of bearings to be lubricated, of a conduit leading to each of said bearings, lubricant supplying means for intermittently delivering lubricant under pressure to said conduits, and metering means in said conduits operable by the pressure of the lubricant, for preventing the delivery of lubricant to said bearings while said lubricant supplying means is operating to increase the pressure on the lubricant in said conduits.

24. A lubricating system for machine bearings, comprising a conduit connecting a source of lubricant supply with a bearing, means for applying and relieving pressure intermittently on the lubricant in said conduit, and a pair of valves in said conduit, the valve nearest the bearing being open and the other valve being closed during low lubricant pressure and said valves being arranged to be closed and opened respectively by an increase in the pressure on the lubricant.

25. A lubricating system for machine bearings, comprising a conduit connecting a source of lubricant supply with a bearing, means for applying and relieving pressure intermittently on the lubricant in said conduit, an inlet and an outlet valve in said conduit, and yielding means to hold the inlet valve closed and the outlet valve open during the period of low lubricant pressure and to permit the inlet valve to be opened and the outlet valve closed by an increase of pressure on the lubricant.

26. A lubricating system comprising a receptacle for lubricant, a conduit leading therefrom to a part to be lubricated, an air chamber, a valve casing interposed in said conduit, a valve in said casing adapted to normally cut off communication between the receptacle and the air chamber, a second valve movable with the first named valve and normally held in position, permitting communication between the air chamber and the part to be lubricated, means for forcing lubricant from the receptacle into said conduit to move said valve to open communication between the receptacle and the air chamber and instantaneously close communication between the air chamber and the part to be lubricated whereby said air chamber is charged with lubricant backed by air under pressure, means for shifting said valves simultaneously when the pressure on the lubricant from the receptacle is released to close communication between the receptacle and the air chamber and open communication between the air chamber and the part to be lubricated, whereby the lubricant is gradually forced to the part to be lubricated solely by the trapped air under presure after communication beween the receptacle and air chamber has been cut off.

27. A lubricating system for the chassis bearings of an automobile, comprising a lubricant reservoir, a main conduit connected to said reservoir and having a plurality of branches each connected to one of the bearings, mechanism for successively producing conditions of high and low pressure on the lubricant in the main conduit, a measuring means in each branch conduit and operable by changes of pressure on the lubricant in the branch to forward uniform quantities of lubricant toward the bearing to which the branch is connected, the length of conduit between the point of application of pressure by said mechanism and one of said measuring means being greater than the length of the conduit from said point to another of said measuring means, and power transmitting devices to actuate said mechanism by the power of the power plant of the vehicle at predetermined intervals to supply lubricant to each bearing for very short times separated by the time required for many rotations of the vehicle wheels.

28. In a lubricating system comprising a source of lubricant, a conduit leading therefrom to a part to be lubricated, means for forcing lubricant into said conduit under pressure, and means in connection with the conduit, and including an air chamber for receiving lubricant under pressure from said conduit, whereby air is trapped and compressed in said chamber at the rear of the lubricant, and means permitting discharge of lubricant from said air chamber under the action of the air compressed therein only when communication is cut off between the air chamber and the source of lubricant.

29. In a lubricating apparatus, the combination of a plurality of oil reservoirs each presenting a chamber in which air is trapped and compressed above the body of oil in the reservoir by the inflow of oil thereto, a conduit connected to said reservoirs and through which oil may be supplied thereto, and valve means to prevent flow of oil from one of said reservoirs by way of said conduit to another, and movable under application of lubricant pressure to provide an open passageway for flow of lubricant into the reservoir.

30. In a lubricating apparatus, the combination of a plurality of oil reservoirs each presenting a chamber in which air is trapped above the body of oil in the reservoir, a conduit connected to said reservoirs and through which oil may be supplied thereto, valve means to prevent flow of oil from one of said reservoirs to another by way of said conduit, and valve means controlling the outflow of oil from each reservoir under the influence of said trapped air.

31. In a lubricating apparatus, the combination of a plurality of chambers each having a single inlet, an outlet for feeding oil from the chamber to a part to be supplied with oil, and a space in which air is trapped and compressed above the body of oil by the inflow of oil thereto; means for supplying oil to said chambers under pressure through the inlet, and means to prevent backward flow of oil from said chambers toward said oil supplying means and from one of said chambers to another.

32. In a lubricating apparatus, the combination of a plurality of oil reservoirs, a conduit connected to said reservoirs, and through which oil may be supplied thereto, each of said reservoirs presenting a chamber in which air is trapped above the body of oil and compressed as the oil is supplied thereto, and automatically operable valve means to prevent flow of oil from one of said reservoirs by way of said conduit to another.

33. In a lubricating apparatus, the combination of a plurality of oil reservoirs, a conduit connected to said reservoirs and through which oil may be supplied thereto, each of said reservoirs presenting a chamber in which air is trapped above the body of oil and compressed as the oil is supplied thereto, automatically operable valve means to prevent flow of oil from one of said reservoirs by way of said conduit to another, and valve means controlling the outflow of oil from each reservoir under the influence of said trapped air.

34. In a lubricating apparatus, the combination of a plurality of chambers, each having an outlet for feeding oil therefrom and a space in which air is trapped above the body of oil, means for supplying oil to said chambers under pressure, and automatically operable means to prevent back-flow of oil from said chambers toward said oil supplying means and from one of said chambers to another.

35. A lubricating system comprising a main pump, a main distribution system connected thereto, secondary pumps actuated by and in accordance with the actuation of the main pump and a secondary distribution system connecting the secondary pump to a bearing, and an auxiliary chamber, valved means of communication between the auxiliary chamber and the main distribution system, and means of communication between the auxiliary chamber and the secondary pump.

36. A lubricating system for machine bearings, comprising a lubricant reservoir, connections including a conduit from the reservoir to the bearing to be lubricated, mechanism for successively producing conditions of high and low pressure on the lubricant in the conduit, and measuring means in the conduit between said mechanism and the bearing, said measuring means comprising a plunger chamber having an inlet and an outlet port, a plunger in said chamber yieldingly held at the reservoir end of the chamber when the lubricant pressure is low and arranged to be moved in said chamber away from said end by high pressure on the lubricant, and a pressure chamber communicating with said plunger chamber and arranged to receive lubricant from the conduit when the pressure on the lubricant is high, said plunger being arranged to open and close communication between the pressure chamber and the plunger chamber.

37. A lubricating system for machine bearings, comprising a lubricant reservoir, connections including a conduit from the reservoir to the bearing to be lubricated, mechanism for successively producing conditions of high and low pressure on the lubricant in the conduit, and measuring means in the conduit between said mechanism and the bearing, said measuring means comprising a plunger chamber having an inlet and an outlet port, a plunger in said chamber yieldingly held at the reservoir end of the chamber when the lubricant pressure is low and arranged to be moved in said chamber away from said end by high pressure on the lubricant, and a pressure chamber communicating with said plunger chamber and arranged to receive lubricant from the conduit when the pressure on the lubricant is high, said plunger being arranged to open and close communication between the pressure chamber and the plunger chamber, and said pressure chamber being in communication with said plunger chamber when the pressure on the lubricant in the conduit is low.

38. A lubricator of the class described having a receiving compartment for a lubricant and a pressure compartment, a pump to transfer oil from the first compartment to the second compartment under pressure, a continuously driven distributing valve in communication with the pressure compartment and having a plurality of discharge outlets vertically registering with the pressure compartment, and means to variously direct the lubricant from the several outlets.

39. In a lubricator of the class described, an oil distributing valve, means to maintain a supply of oil under pressure for said distributing valve, and means adapted to receive oil from the distributing valve and pass the same in measured quantities, said last-mentioned means being subject for its operation to the oil received thereby.

40. A centralized lubricating system comprising a reservoir, a branched conduit system connecting said reservoir with bearings requiring lubrication, a lubricant pressure supply mechanism for intermittently injecting charges of lubricant under pressure into said branched conduit system, and pneumatic means in said branches energized solely by the pressure created by said mechanism and serving to supply lubricant to the bearings, said pneumatic means supplying lubricant to said bearings after cessation of pressure from said mechanism.

41. In a lubricating system of the class described, the combination of a lubricant reservoir, a plurality of branched conduits connected with bearings requiring lubrication, a pump supplied from said reservoir and successively connected with said branched conduits, and metering means in the branches of said conduits.

42. In a lubricating system for automobiles, the combination of a lubricant reservoir, a plurality of branched conduits connected with bearings requiring lubrication, a pump supplied from said reservoir and successively connected with said branched conduits, means for driving said pump from the engine of the automobile, and metering means in the branches of said conduits.

43. In a lubricating system of the class described, the combination of a lubricant reservoir, a plurality of branched conduits connected with bearings requiring lubrication, a pump supplied from said reservoir and successively connected with said branched conduits, and measuring valves in the branches of said conduits.

44. In a lubricating system of the class described, the combination of a lubricant reservoir, a plurality of branched conduits connected with bearings requiring lubrication, a pump supplied from said reservoir, power driven means for successively connecting said pump with said conduits, and metering means in the branches of said conduits.

45. In a lubricating system for automotive vehicles, the combination of a lubricant reservoir, branched conduits connected with bearings requiring lubrication, a pump supplied from said reservoir, means for intermittently connecting said pump with each of said conduits, means for driving said pump and connecting means from the motor of the vehicle, and metering means in the branches of said conduits.

46. In a centralized lubricating system of the class described, a lubricant reservoir, a pump supplied therefrom, a branched conduit system connecting said pump with bearings requiring lubrication, lubricant flow metering means in the branches of said system, and mechanism including variable speed gearing for driving said pump.

47. In a centralized lubricating system of the class described, the combination of a lubricant reservoir, a pump supplied therefrom, a branched conduit system connecting said pump with bearings requiring lubrication, metering devices in the conduit branches, and power operated means for selectively driving said pump at different speeds.

48. In a centralized lubricating system for the chassis bearings of an automobile, a lubricant reservoir, a pump supplied thereform, a branched conduit connecting said pump with the chassis bearings, metering devices in the branches of said conduit and adjacent said bearings, mechanism for driving said pump at either of two different speeds, said mechanism receiving its energy from the engine of the automobile, and manually operable means for selecting either speed of operation for said pump.

49. A measuring valve comprising a valve chamber having an inlet and an outlet, and an air chamber accessible only through said inlet and outlet, a valve member reciprocable in said chamber and adapted alternately to interrupt communication between said air chamber and said inelt and outlet, and spring means normally positioning said valve member to cut off communication between said air chamber and said inlet.

50. In an automobile, a lubricant reservoir, pressure supply means deriving its lubricant from said reservoir, connections between a bearing of the vehicle and said pressure supply means, metering means in said connections, and means operable at intervals by the motor mechanism of the vehicle to enable said lubricant pressure supply means to force lubricant into said connections.

51. In an automobile having a motor mechanism for driving the same, an oil reservoir, connections between a plurality of bearings of the vehicle and said reservoir, means in said connections for accurately metering the flow of oil therethrough, and means operable at intervals of irregular duration dependent upon variations in the operation of the motor mechanism of the vehicle to control the flow of oil from said reservoir through said connections to said bearings.

52. In a lubricating system for an automotive vehicle having motor mechanism for propelling the same, a lubricant reservoir, a branched conduit system leading to a plurality of bearings of said vehicle, metering means in said conduit system associated respectively with the bearings to be lubricated to supply accurately measured charges of lubricant thereto, means for forcing lubricant from said reservoir to said conduit system, and means deriving its motivating power from the engine of said vehicle to render said last-named means ineffective.

53. In an automobile having an engine, an oil reservoir, connections between the reservoir and a plurality of chassis bearings of the automobile, metering means of metal in said connections to properly apportion oil among the several chassis bearings, and means driven from the engine to initiate the flow of oil through said connections and metering means to said bearings.

54. In a centralized lubricating system for the lubrication of the chassis bearings of an automotive vehicle having a motor for propelling the same, the combination of an oil reservoir, a pump deriving its supply of oil from said reservoir and adapted to discharge oil under pressure, a branched conduit system supplied with oil by the discharge of said pump, lubricant flow metering devices positioned adjacent the ends of the branches of said conduit system for proportioning the discharge of said pump among a plurality of said chassis bearings in accordance with their predetermined requirements, and means controlled by the said engine of said vehicle for intermittently interrupting the discharge of oil into said conduit system by said pump.

55. In an automobile having chassis bearings requiring lubrication and an engine, a centralized lubricating system comprising a pumping mechanism deriving power from said engine, a branched conduit system leading to a plurality of chassis bearings having predetermined diverse lubrication requirements, metering means for apportioning the lubricant supplied by said pumping mechanism among said chassis bearings in predetermined amounts corresponding to their requirements, said pumping mechanism being operated to inject charges of oil into said conduit system intermittently, and said conduit system having resiliency for temporarily storing part of the lubricant injected and supplying it to the bearings in a slow substantially continuous flow, and valve mechanism in said metering means for preventing the draining of the lubricating system when the automobile is not in operation.

56. In an automobile having power mechanism for propelling the same, a centralized lubricating system comprising an oil reservoir, a power driven pump supplied therefrom, a branched conduit system connecting said pump with a plurality of bearings having different lubrication requirements, power operated control means coordinated with said pump to regulate the supply of lubricant to said conduit system, and metering means in the branches of the conduit system to apportion the lubricant among the bearings according to their individual requirements.

57. In a lubricating system for the chassis bearings of an automobile, a pump having a casing, a member movable in said casing to discharge oil therefrom under pressure, a reservoir connected with said casing and forming the source of supply for said pump, a branched conduit system connecting said pump with a plurality of bearings having different lubrication requirements, power operated means coordinated with said pump to regulate the supply of oil to said conduit system, and metering means of predetermined diverse ratings in the branches of said conduit system to apportion the lubricant supplied to the bearings according to their individual requirements.

58. In an automobile having engine bearings and chassis bearings, a lubricating system for said bearings comprising a lubricant reservoir, a pump having its inlet near the bottom of said reservoir and deriving its power from the engine of the automobile, a conduit system leading from the discharge of said pump to the engine bearings, a branched conduit system supplied with oil from said pump and leading to the chassis bearings to be lubricated, flow metering means in the branches of said last named conduit system, and means operated from the engine of the vehicle for intermittently connecting said last named conduit system with the discharge of said pump.

SYLVANUS D. LOCKE.
CHARLES R. DOSCH.